Figure 1:
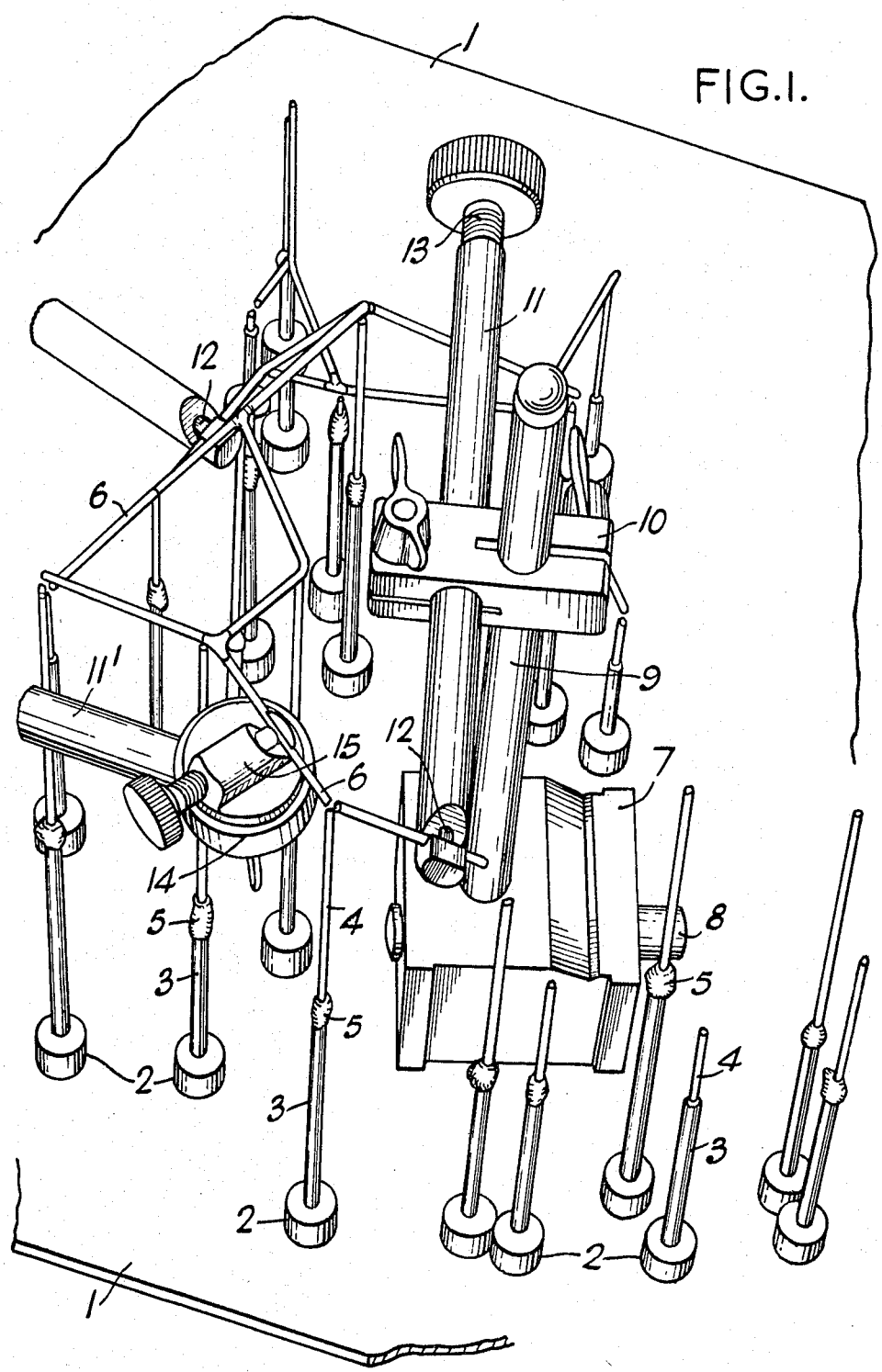

3,286,339
CONSTRUCTION OF MODELS REPRESENTING MOLECULAR AND OTHER STRUCTURES
Olga Kennard, Cambridge, and Charles Frank Gamblin Doré, Harrow, Middlesex, England, assignors to National Research Development Corporation, London, England, a corporation of Great Britain
Filed July 18, 1963, Ser. No. 295,941
Claims priority, application Great Britain, July 30, 1962, 29,263/62
10 Claims. (Cl. 29—466)

This invention relates to the construction of models comprising structural wire elements joined together to represent the configuration of molecules, architectural and other designs and has for its object the provision of equipment for and a method of constructing such models.

According to the invention there is provided a method of constructing a model which comprises joining together end to end by brazing, soldering or other methods a number of structural wire elements representing the essential structure or framework of the model, the elements being held in the correct angular disposition to one another during the joining by clamping means secured magnetically to a base or datum plane.

The method of the invention is of special application to the construction of molecular models and is particularly useful to produce models of even highly complex molecules.

According to one aspect of the invention a method of constructing a molecular model comprises disposing on a flat horizontal base or datum plane a two co-ordinate projection of the atomic centres of the molecule, mounting at the projection of each atomic centre a member of length equivalent to the third co-ordinate of the atom whereby the positions of the atomic centres in space are determined, clamping wire elements to extend between adjacent atomic centres to represent valence bonds, and joining adjacent valence bond elements end to end by brazing, soldering or other methods, the means for clamping the valence bond elements being magnetically secured to the base against movement out of position during the joining operation. The method may be practised with either orthogonal or non-orthogonal co-ordinate data.

The horizontal base or datum plane on which the parts are mounted is conveniently of magnetic or magnetisable material and magnets are associated with the "third co-ordinate" members and the clamping means.

The "third co-ordinate" member preferably consists of a base portion comprising a permanent magnet and a holder in which a rod for indicating the length of the co-ordinate is adjustably mounted. The strength of the magnet should of course be sufficient to hold the member firmly in position on the base against accidental movement, whilst still enabling the member to be lifted off the base with moderate manual force.

The clamping means may conveniently take the form of a magnetic chuck, i.e. a chuck which can be magnetically locked in position and subsequently freed by the operation of a switch or plunger according to whether it is electrically or magnetically operated. Alternatively arrangements may be made to magnetise and de-magnetise the base itself to provide the magnetic locking force holding the members securely in position during the joining operation.

It will be appreciated that the use of "third co-ordinate" members and clamping means according to the invention obviates the need for a brazing jig of complex design and will facilitate the joining together of complex configurations representing different parts of, for example, polycyclic molecules with highly involved stereochemistry.

The method can be readily practised from data recorded in the literature for the three co-ordinates of each atom in the molecule. With the spatial positions of the atomic centres determined, the bond lengths are fixed and appropriate lengths of welding wire are cut to represent them and are joined usually by soldering.

A modification of the above method is also possible, in accordance with the invention, which can be practised from tabulated bond lengths angle data instead of 3-co-ordinate data. This method involves the use of one or more angle pieces which enable the operator to fix the accurate angular relationship of two wire elements representing valence bonds emanating from an atomic centre. Each angle piece is plate-like in form and has at least one pair of grooves of a size to accommodate the wire elements and meeting together at an angle which is marked on the plate. Preferably the grooves are located along the edge of the plate and for economy and general convenience the plate is advantageously quadrilateral or more-than-four sided, providing four or more marked angles for each plate. Preferably, a set of such angle pieces is provided with angles increasing regularly over a range, e.g. by increments of 0.5°. With a quadrilateral piece for example, opposite angles differing by 1° are readily provided. A series of angle pieces providing a range of angles from 60° to 135° in intervals of 0.5° is very convenient for most requirements.

In addition to the angle pieces defined above the invention includes a method of constructing a molecular model which comprises disposing end to end and at an angle to each other wire elements of appropriate length representing valence bonds emanating from an atomic centre, adjusting said angle to the required value by means of an angle piece having grooves which run at the required angle to each other and into which the wire elements fit when their adjustment is correct, clamping said elements in the position determined by means of clamping means magnetically secured on a flat horizontal base, and joining said elements end to end.

It will of course be realised that the correct spatial relation of two adjacent valence bonds in a non-planar structure is determined by two angles. For this reason the clamping means employed in both methods of construction described above will enable the angular disposition of each wire element relative to the horizontal base to be adjusted before adjacent elements are joined together. This adjustment may conveniently be made with the aid of a pendant clinometer.

It is sometimes found convenient to position the structural wire elements in a configuration pattern as given by a two co-ordinate projection of the structure on a horizontal base, by means of the use of parallel beams of light incident normally to the horizontal base. Structural wire elements of appropriate length representing valence bonds can then be disposed over the corresponding bond on the co-ordinate projection on the horizontal base, and their positions adjusted until their projected shadows coincide with the corresponding co-ordinate projection.

In assembling a model it is also possible to construct it in two parts and to attach to the end of one a tubular element into which a terminal valence bond of the other can fit so as to be freely rotatable about its axis; in this way the rotation of parts of the molecule may readily be demonstrated in the model.

After the framework has been assembled, spheres representing the individual atoms may be built on to the framework. Such spheres are readily moulded from suitable plastics material e.g. cold setting polyurethane foam and cut on a guillotine device into parts which are subsequently re-united around the framework by means of an adhesive.

Figure 2:
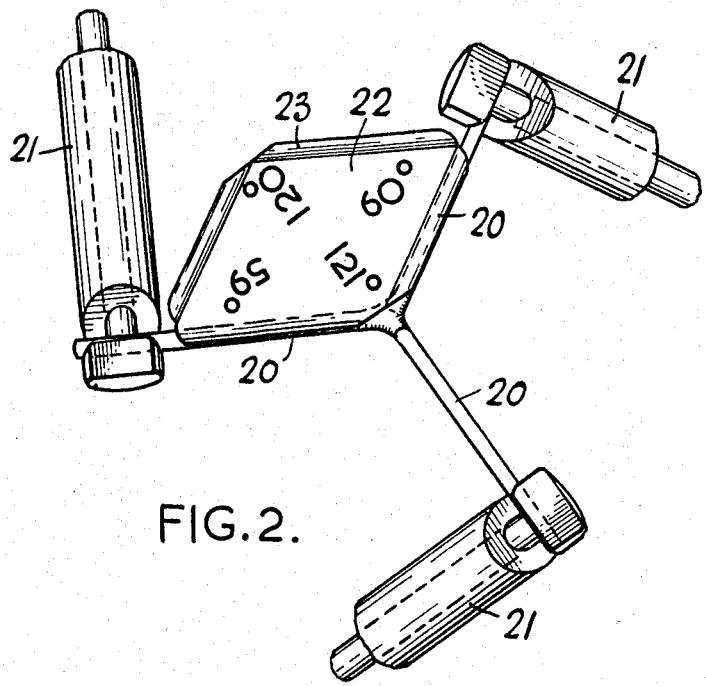
Figure 3:
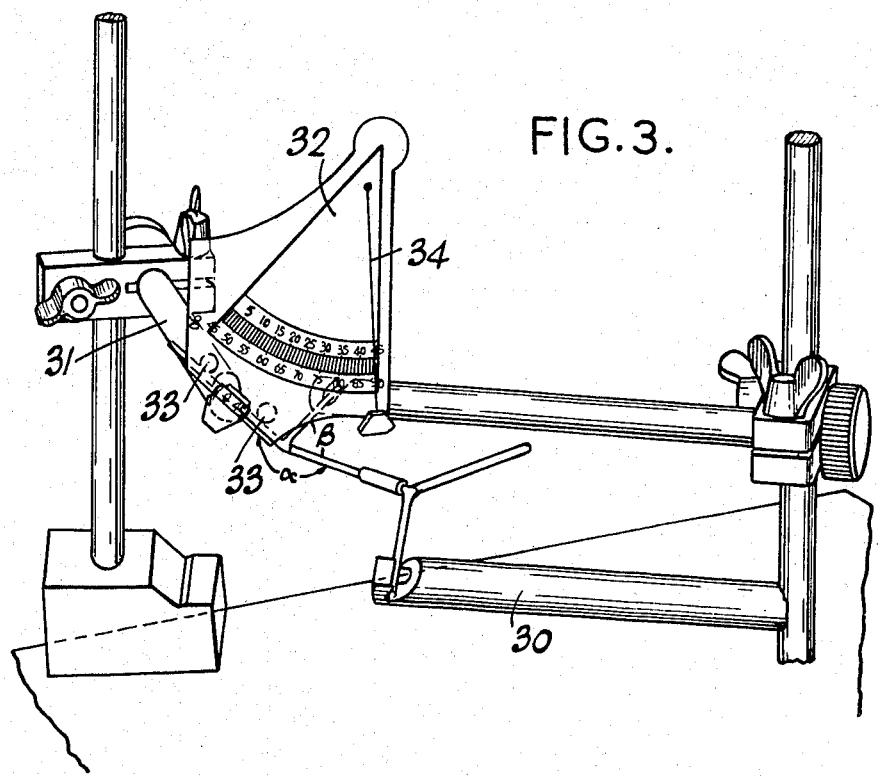
Figure 4:
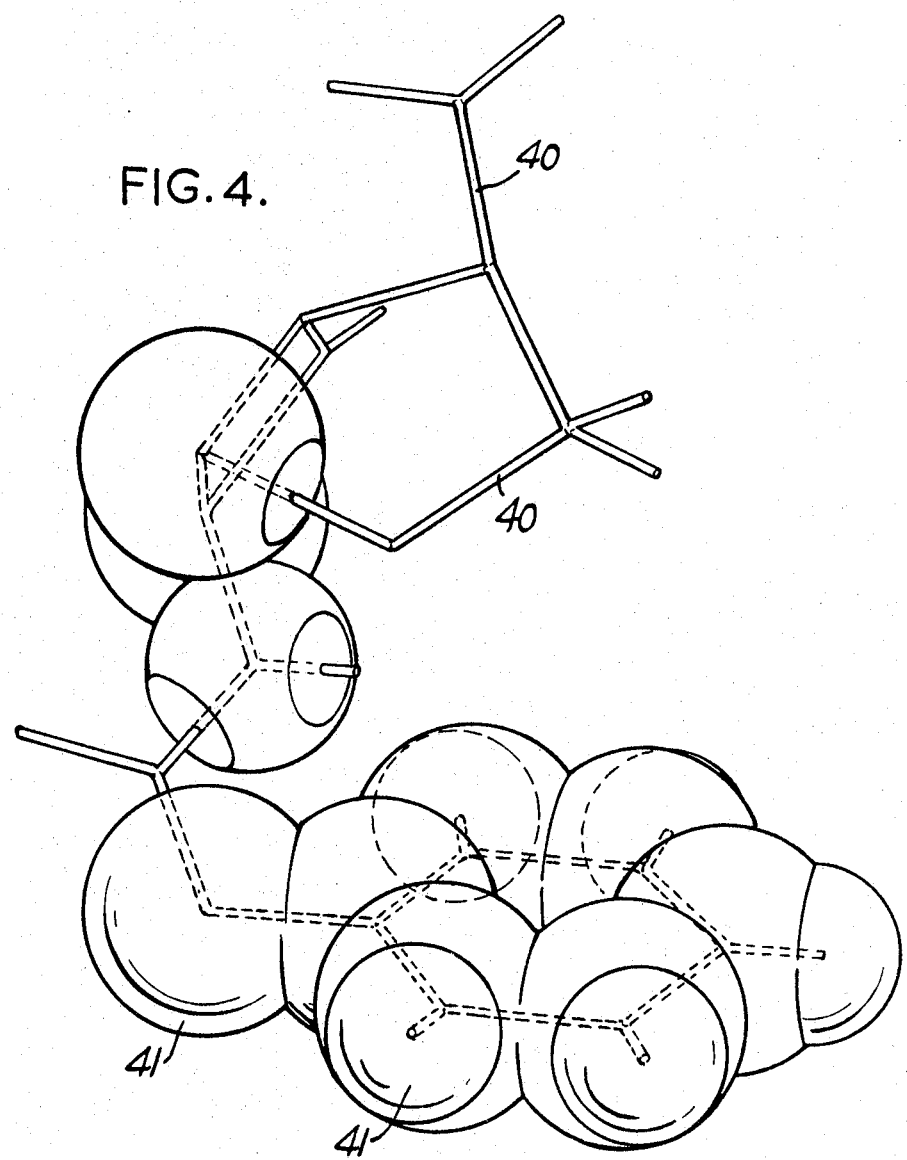

The invention will now be described by way of example with reference to the accompanying illustrations in which:

FIGURE 1 shows an assembly of the equipment for supporting the structural wire elements, FIGURE 2 shows the angular positioning of structural wire elements by means of an angle piece, FIGURE 3 shows the use of a pendant clinometer for positioning a structural wire element at an angle to the horizontal, and FIGURE 4 is a perspective view of a molecular model constructed by the method of the invention.

Referring now to FIGURE 1 the various elements of the apparatus are shown assembled on a horizontal base plate 1 of iron or steel. A two dimensional plot having been made on a sheet of drawing paper (not shown) fixed to the base plate 1 a number of ring magnets 2 are mounted over the points representing atomic centres. For accuracy of positioning, circles are scribed about the atomic centres in which the magnets are set. Each ring magnet 2 is fitted with a vertical tubular holder 3 in which a pointer rod 4 representing the third co-ordinate can slide vertically. The appropriate length for each rod 4 having been determined from tabulated data, the rod 4 is fixed in position in the tube 3 by means of plasticine 5. Alternatively the rods 4 can be a friction fit in the holders 3.

With the pointer rods 4 in position, indicating by their upper ends the spatial positions of the atomic centres, valence bond wire elements 6 are cut from welding wire to the required length. In order to hold firmly each two elements 6 which are to be joined together at their adjacent ends magnetic chucks are provided of which one is shown fully in the drawing. The chuck comprises a magnetisable base 7 containing means for magnetising it (not shown) operated by a plunger 8. Fixed to the base 7 is a vertical column 9 along which a split clamp 10 is slideable. The clamp 10 holds a transverse tubular member 11 grooved at one end to receive a wire element which is gripped therein by means of a rod 12 moveable axially in the member 11 and operated by rotation of a threaded end piece 13.

Part of another magnetic chuck is also shown in the drawing having a rotatable end plate 14 attached to the transverse member 11 carrying a wire element gripping device indicated generally by reference numeral 15.

After any two adjacent valence bond elements have been assembled and fixed in the correct angular relationship the magnetic chucks holding them are energized so that they are firmly held in position on the base plate 1. The ring magnet/pointer rod assemblies are then removed and the adjacent ends of the elements are welded or soldered together.

The operation described is repeated successively until the entire framework has been constructed.

FIGURE 2 is a partial plan view showing a junction formed between three valence bond elements 20 which are gripped by means of magnetic chuck devices shown partly at 21 and of the form described with reference to FIGURE 1. The elements are moved until their angular relationship is correctly assumed this being determined by the use of a quadrilateral angle piece 22 having marked angles of 60°, 65°, 120°, and 121°. The angle piece 22 is moulded or machined from transparent plastic material such as perspex and is provided with four marginal grooves 23 so that it can sit on the wire elements with the grooves along two adjacent sides mating accurately with the elements. To make a three bond junction (planar or non-planar) two angle pieces 22 are required. When the adjustment is correct the magnetic chucks are energised to hold the assembly fast, the angle pieces 22 are removed and the joint is welded or soldered.

Referring now to FIGURE 3 there are shown two magnetic chuck/clamp devices 30 and 31 of the kind described hereinbefore. Clamp 30 holds part of the structure which has already been assembled. The bond structure at its left hand end as shown in the drawing comprises two bonds welded together at the correct angle and disposed in a horizontal plane; the third bond is required to be connected to the junction, the angles between the three bonds being alpha, beta, and gamma. The angle theta of the third bond to the plane of the other two is calculated from the formula $$\cos \theta = \left( \frac{\cos^{2\alpha} + \cos^{2\alpha} - 2 \cos^{\alpha} \cos^{\beta} \cos^{\alpha}}{\sin \beta} \right)^{1/2}$$

The pendant clinometer 32 consists essentially of a partial protractor with projecting pegs 33 made to fit the welding rod used for the molecular models. The projecting pegs are placed across the rod whose inclination is to be adjusted and the angle between the rod and the horizontal is measured with the aid of a plumbline 34 attached to the clinometer.

Referring now to FIGURE 4 there is shown the bond structure of the penicillin molecule constructed from wire elements 40. Generally spherical members 41 representing the atoms of the molecule are shown assembled over part of the wire framework. The spheres 41 are made from foam plastic and after curing they have been cut to enable them to be fitted around the framework and cemented together. Sections of the spheres have been removed where two atoms lie close together with their notional atomic diameters overlapping.

We claim:

1. A method for constructing a model which comprises the steps of:
   (a) placing each of a plurality of linear elements representing the essential framework of the model at a predetermined position and angular disposition with respect to a datum plane base formed of paramagnetic or ferromagnetic material,
   (b) holding the said elements in the said predetermined positions with a clamping means having a magnetizable portion,
   (c) magnetically securing the magnetizable portion to the said base, and
   (d) joining the said elements together.

2. A method as claimed in claim 1 including the step of mounting elongated members on the said base to locate the positions of the ends of the elements with respect to the base.

3. A method as claimed in claim 1 including the step of determining the angular relationship between two elements to be joined by placing the elements in grooves formed in an angular piece, the grooves runnng at the desred angle between the two elements.

4. A method of constructing a molecular model which comprises disposing on a flat horizontal datum plane base a two-co-ordinate projection of the atomic centres of the molecule, mounting at the projection of each atomic centre a member of length equivalent to the third co-ordinate of the atom thereby locating the positions of the atomic centres in space with respect to the said base, clamping framework elements to extend between adjacent atomic centers to represent valence bonds, magnetically securing the clamping means to the base and joining adjacent valence bond elements end to end.

5. A method of constructing a molecular model according to claim 4 comprising the subsequent step of securing to the structural framework spheres representing the atomic constituents thereof.

6. Apparatus for use in the construction of a molecular framework comprising linear framework elements connected end to end comprising a flat base of ferromagnetic or paramagnetic material, a plurality of pointer members positioned on said base over a projection of the atomic centers of the molecule, each pointer member indicating by its upper end the spacial position of the atomic centers with respect to the said base, and a plurality of chuck devices secured by magnetic attraction to the said base and adapted to hold the framework elements firmly in position.

7. An assembly according to claim 6, in which the pointer members comprise rods adjustably movable in a tubular support having a magnetic base.

8. Apparatus for use in the construction of a molecular framework comprising linear framework elements connected end to end comprising, a base of ferromagnetic or paramagnetic material, a plurality of chuck devices secured by magnetic attraction to the said base and adapted to hold the said framework elements firmly in position, at least one angle piece having at least two grooves making an angle with one another for determining the correct angular relationship between the elements, said angle piece being supported by at least two elements being joined end to end and being held firmly in position by the said chuck devices.

9. A method of constructing a molecular model comprising the steps of positioning linear framework elements in the desired angular inter-relationship, holding two elements to be joined in the desired angular relationship within grooves running at the desired angle in an angular piece, holding the elements in said position with chuck devices, magnetically securing the devices to a datum plane base, and joining the elements end to end.

10. A method of constructing a molecular model according to claim 9, comprising the subsequent step of securing to the structural framework spheres representing the atomic constituents thereof.

References Cited by the Examiner

UNITED STATES PATENTS

| | | | |
|---|---|---|---|
| 546,421 | 9/1915 | Duke | 269—9 |
| 1,313,061 | 8/1919 | Brown | 269—9 |
| 1,462,101 | 7/1923 | Colson | 269—8 |
| 2,443,582 | 6/1948 | Lendo et al. | 269—8 |
| 2,824,536 | 2/1958 | Gamble | 269—37 |
| 2,923,865 | 2/1960 | Brandenburg | 269—8 |
| 3,072,396 | 1/1963 | McBurney | 269—45 |

FOREIGN PATENTS

| | | |
|---|---|---|
| 632,391 | 11/1949 | Great Britain. |
| 706,827 | 6/1952 | Great Britain. |

JOHN F. CAMPBELL, *Primary Examiner.*

WHITMORE A. WILTZ, *Examiner.*

M. L. FAIGUS, *Assistant Examiner.*